(12) United States Patent
Nishi et al.

(10) Patent No.: US 10,865,730 B2
(45) Date of Patent: Dec. 15, 2020

(54) FUEL SUPPLY SYSTEM FOR ENGINE, FUEL INJECTION CONTROL DEVICE FOR ENGINE, AND FUEL SUPPLY METHOD FOR ENGINE

(71) Applicant: SUBARU CORPORATION, Tokyo (JP)

(72) Inventors: Daiki Nishi, Tokyo (JP); Shunsuke Ohsawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/739,302

(22) Filed: Jan. 10, 2020

(65) Prior Publication Data
US 2020/0291887 A1    Sep. 17, 2020

(30) Foreign Application Priority Data
Mar. 15, 2019    (JP) ................................. 2019-048047

(51) Int. Cl.
*F02M 1/00* (2006.01)
*F02D 41/40* (2006.01)
(Continued)

(52) U.S. Cl.
CPC .......... *F02D 41/40* (2013.01); *F02D 41/008* (2013.01); *F02D 2041/389* (2013.01);
(Continued)

(58) Field of Classification Search
CPC ............... F02D 19/081; F02D 41/0025; F02D 41/0032; F02D 41/0042; F02D 41/0047;
(Continued)

(56) References Cited

U.S. PATENT DOCUMENTS 5,816,353 A * 10/1998 Matsuki ................. B60K 28/16
                                                                180/197
5,988,144 A * 11/1999 Yoshioka .............. F02D 41/126
                                                                123/493
(Continued)

FOREIGN PATENT DOCUMENTS

| JP | 2003-254126 A | 9/2003 |
| JP | 2006-275003 A | 10/2006 |
| JP | 2016-125448 A | 7/2016 |

*Primary Examiner* — John Kwon
(74) *Attorney, Agent, or Firm* — Troutman Pepper Hamilton Sanders LLP (57) ABSTRACT

A fuel supply system includes an injector, an air flow meter, and an engine controller. The engine controller includes a fuel supply amount setting unit, a fuel cut controller, a fuel supply amount correcting unit, and an injector controller. The fuel supply amount setting unit sets a fuel supply amount on the basis of an intake air amount. The fuel cut controller executes and ends a fuel cut. The fuel supply amount correcting unit increases, on the basis of a reverse air amount, the fuel supply amount after the fuel cut in at least one cylinder, with respect to a basic supply amount corresponding to the intake air amount. An amount of the increase is greater at an initial fuel supply than in fuel supply at a second time and onward. The injector controller outputs, to the injector, a signal corresponding to the increased fuel supply amount.

14 Claims, 4 Drawing Sheets

(51) Int. Cl.
   *F02D 41/00* (2006.01)
   *F02D 41/38* (2006.01)
(52) U.S. Cl.
   CPC .... *F02D 2200/021* (2013.01); *F02D 2200/04* (2013.01); *F02D 2200/0404* (2013.01); *F02D 2200/101* (2013.01)
(58) Field of Classification Search
   CPC ............... F02D 41/005; F02D 41/0052; F02D 41/0057; F02D 41/0062; F02D 41/0065; F02D 41/0072; F02M 25/08
   USPC .................. 123/434, 698; 701/103–105, 108
   See application file for complete search history.

(56) References Cited

U.S. PATENT DOCUMENTS

| | | | | |
|---|---|---|---|---|
| 6,148,611 A | * | 11/2000 | Sato | F02D 31/008 123/680 |
| 2003/0164152 A1 | * | 9/2003 | Iwasaki | F02D 13/0261 123/319 |
| 2012/0006307 A1 | * | 1/2012 | Demura | F02D 41/2454 123/674 |
| 2012/0323466 A1 | * | 12/2012 | Iwazaki | F02D 41/1454 701/104 |
| 2013/0138329 A1 | * | 5/2013 | Aoki | G01N 27/4075 701/104 |
| 2013/0144510 A1 | * | 6/2013 | Iwazaki | F02D 41/0255 701/104 |
| 2013/0325296 A1 | * | 12/2013 | Koshi | F02D 41/1454 701/104 |

\* cited by examiner

FIG. 4

FUEL SUPPLY SYSTEM FOR ENGINE, FUEL INJECTION CONTROL DEVICE FOR ENGINE, AND FUEL SUPPLY METHOD FOR ENGINE

CROSS-REFERENCE TO RELATED APPLICATIONS

The present application claims priority from Japanese Patent Application No. 2019-048047 filed on Mar. 15, 2019, the entire contents of which are hereby incorporated by reference.

BACKGROUND

The disclosure relates to a fuel supply system, a fuel injection control device, and a fuel supply method for an engine in which a fuel cut is performed.

In an engine for a vehicle, for example, an engine that uses gasoline as fuel, an intake air amount of the engine is detected. On the basis of the detected intake air amount, a fuel amount is set. At the fuel amount, the fuel is supplied to combustion chambers. An intake air amount is often detected by using an air flow meter installed in an intake channel. If predetermined fuel cut conditions are satisfied, a fuel cut is performed in such an engine in order to cut fuel consumption, for example. During the fuel cut, supply of fuel to the engine is temporarily stopped. If predetermined fuel cut end conditions are satisfied during execution of the fuel cut, the fuel cut ends. Supply of fuel to the engine is then restarted. As disclosed in Japanese Unexamined Patent Application Publication No. 2003-254126, there has been a technology regarding a fuel injection control for an engine. In the technology, an increase correction is performed on a fuel injection amount upon return from a fuel cut for a predetermined period of time until an air-fuel ratio feedback control starts.

SUMMARY

An aspect of the disclosure provides a fuel supply system for an engine. The fuel supply system includes a fuel injector, an air flow meter, and an engine controller. The fuel injector is configured to supply fuel into a combustion chamber of the engine. The air flow meter is configured to detect an intake air amount of the engine. The engine controller is configured to control a fuel supply amount from the fuel injector. In the aspect, the engine controller includes a fuel supply amount setting unit, a fuel cut controller, a fuel supply amount correcting unit, and a fuel injector controller. The fuel supply amount setting unit is configured to set a fuel supply amount on the basis of the intake air amount detected by the air flow meter. The fuel cut controller is configured to execute a fuel cut that stops supply of the fuel by the fuel injector if a predetermined fuel cut condition is satisfied. The fuel cut controller is configured to end the fuel cut if a predetermined fuel cut end condition is satisfied. The fuel supply amount correcting unit is configured to perform, on the basis of a reverse air amount from an exhaust channel of the engine to the combustion chamber during execution of the fuel cut by the fuel cut controller, an increase correction on the fuel supply amount from the fuel injector upon end of the fuel cut in at least one cylinder of the engine, with respect to a basic supply amount corresponding to the intake air amount. An amount of the increase correction is greater at an initial fuel supply than in fuel supply at a second time and onward. The fuel injector controller is configured to output, to the fuel injector, a drive signal corresponding to the fuel supply amount that has undergone the increase correction by the fuel supply amount correcting unit.

An aspect of the disclosure provides a fuel injection control device for an engine. The fuel injection control device is configured to control a fuel injection amount of a fuel injector configured to supply fuel into a combustion chamber of the engine. The fuel injection control device according to the aspect includes circuitry. The circuitry is configured to set a basic injection amount of the fuel injector on the basis of an intake air amount of the engine. The circuitry is configured to execute a fuel cut that stops injection of the fuel by the fuel injector if a predetermined fuel cut condition is satisfied. The circuitry is configured to end the fuel cut if a predetermined fuel cut end condition is satisfied. The circuitry is configured to perform, on the basis of a reverse air amount from an exhaust channel of the engine to the combustion chamber during execution of the fuel cut, an increase correction on the fuel injection amount at initial fuel injection by the fuel injector upon end of the fuel cut in at least one cylinder of the engine, with respect to the basic injection amount. An amount of the increase correction is greater at the initial fuel injection than in fuel injection at a second time and onward. The circuitry is configured to output, to the fuel injector, a drive signal corresponding to the fuel injection amount that has undergone the increase correction.

An aspect of the disclosure provides a fuel supply method for an engine. The fuel supply method is configured to control a fuel amount at which a fuel injector supplies fuel to a combustion chamber of the engine. The fuel supply method according to the aspect includes: detecting an intake air amount of the engine; setting a basic value of the fuel amount at which the fuel is to be supplied, on the basis of the detected intake air amount; executing a fuel cut that stops supply of the fuel by the fuel injector if a predetermined fuel cut condition is satisfied; ending the fuel cut if a predetermined fuel cut end condition is satisfied; performing, on the basis of a reverse air amount from an exhaust channel of the engine to the combustion chamber during execution of the fuel cut, an increase correction on a fuel supply amount from the fuel injector upon end of the fuel cut in at least one cylinder of the engine, with respect to the basic value, an amount of the increase correction being greater at an initial fuel supply than in fuel supply at a second time and onward; and controlling an operation regarding supply of the fuel by the fuel injector on the basis of the fuel supply amount that has undergone the increase correction.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

In the following, some example embodiments of the disclosure are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

One example embodiment of the disclosure provides a fuel injection control device for an engine and a fuel supply system including the fuel injection control device. It is possible to apply the fuel injection control device and the fuel supply system to an internal combustion engine mounted as a travel power source in a vehicle such as a passenger car. The internal combustion engine will be hereinafter simply referred to as an "engine". One example engine to which the example embodiment is applicable may be a horizontally opposed, four-cylinder, gasoline direct injection engine.

Figure 1:
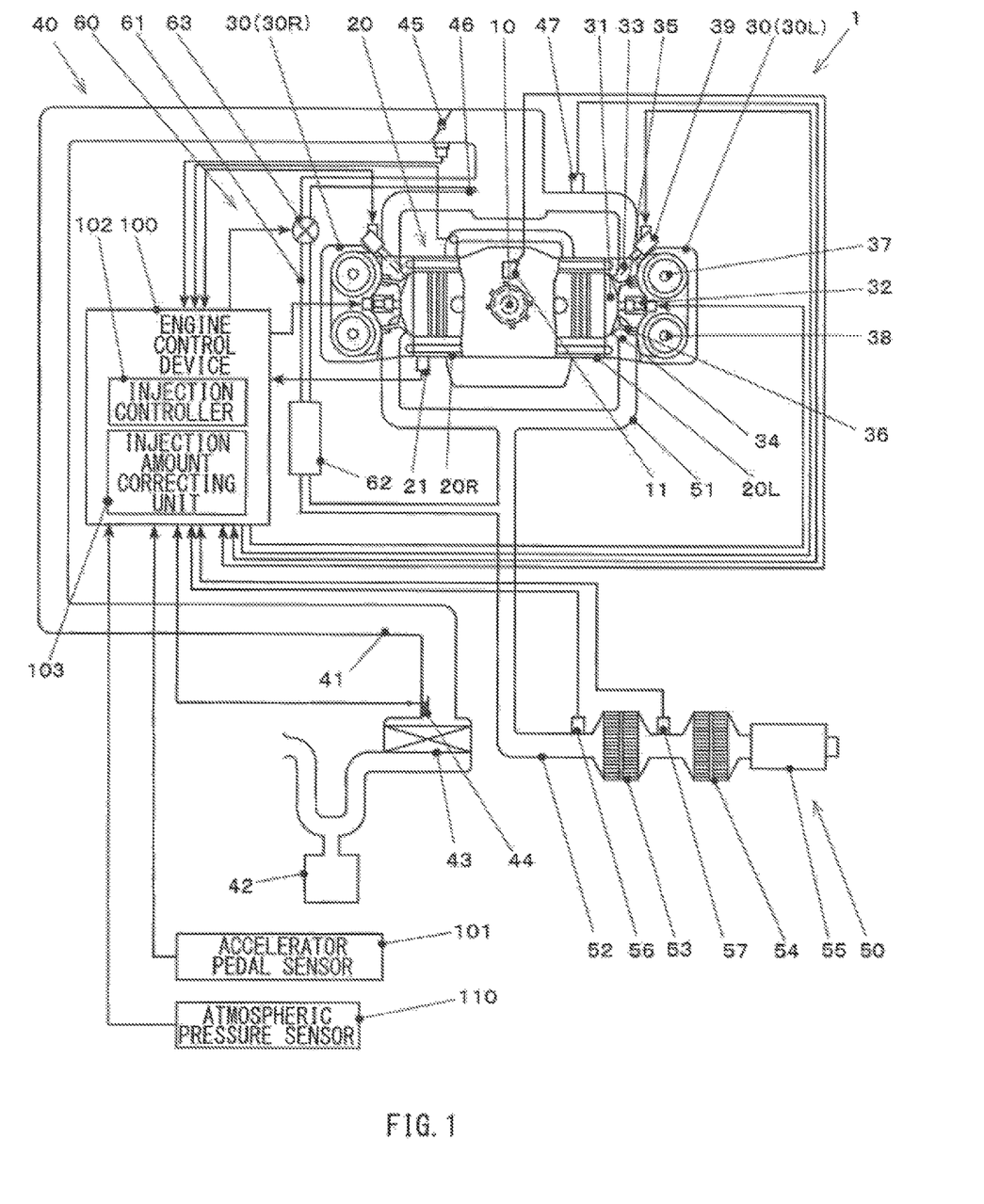
FIG. 1 is a diagram schematically illustrating a configuration of an engine including a fuel injection control device according to one example embodiment of the disclosure.

FIG. 1 is a diagram schematically illustrating a configuration of an engine 1 according to the example embodiment.

The engine 1 may include a crankshaft 10, cylinder blocks 20, cylinder heads 30, an intake system 40, an exhaust system 50, an exhaust gas recirculation (EGR) device 60, and an engine control device 100, for example. The cylinder blocks 20 may include a cylinder block 20R and a cylinder block 20L. The cylinder heads 30 may include a cylinder head 30R and a cylinder head 30L.

The crankshaft 10 may be a rotating shaft serving as an output shaft of the engine 1.

To one end of the crankshaft 10 may be coupled a power transmission mechanism including a transmission, for example. The power transmission mechanism and the transmission are not illustrated.

The crankshaft 10 may be provided with crank pins arranged in an eccentric manner from the rotating shaft.

Figure 2A:
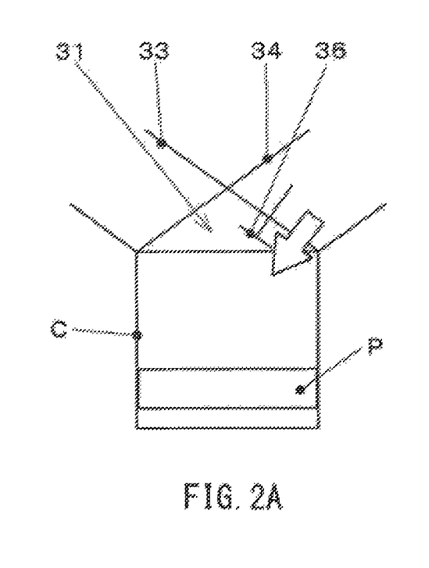
FIGS. 2A to 2C are diagrams illustrating a mechanism of how air flows back from an exhaust channel into a combustion chamber during a fuel cut in the engine illustrated in FIG. 1.
Figure 2B:
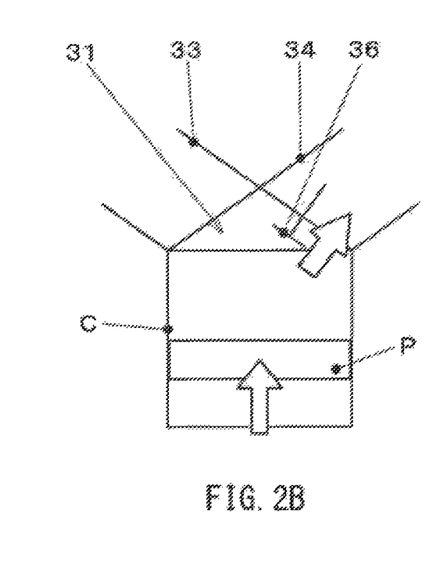
Figure 2C:
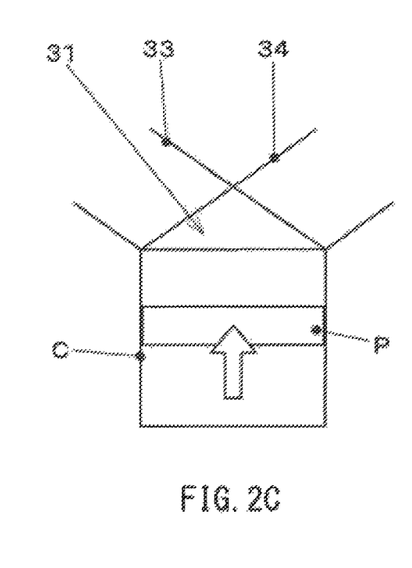

To the crank pins may be coupled respective pistons P via connecting rods. The connecting rods are not illustrated. See FIG. 2.

An end of the crankshaft 10 may be provided with a crank angle sensor 11. The crank angle sensor 11 may detect an angular position of the crankshaft.

An output of the crank angle sensor 11 may be transmitted to the engine control device 100.

The engine control device 100 may calculate an engine speed or a crankshaft rotational speed on the basis of the output of the crank angle sensor 11.

With a two-divided configuration, the cylinder blocks 20 may include the cylinder block 20R on a right side and the cylinder block 20L on a left side. The cylinder blocks 20 may pinch the crankshaft 10 in left and right directions in a case where the engine is longitudinally mounted on a vehicle body.

The cylinder blocks 20 may form a middle portion serving as a crank case.

The crank case may be a space used to accommodate the crankshaft 10.

The crank case may be provided with main bearings that rotatably support journals of the crankshaft 10.

The cylinder block 20R and the cylinder block 20L may be respectively disposed on the right side and the left side to pinch the crank case. The cylinder block 20R on the right side and the cylinder block 20L on the left side may each be provided with two cylinders C in a case of a four-cylinder engine, for example. Inside the cylinders C, the pistons P being inserted may move back and forth. See FIG. 2.

The cylinder blocks 20 may be provided with a water temperature sensor 21.

The water temperature sensor 21 may be a temperature sensor that detects a temperature of cooling water in the engine 1.

An output of the water temperature sensor 21 may be transmitted to the engine control device 100.

The cylinder heads 30, i.e., the cylinder head 30R on the right side and the cylinder head 30L on the left side, may be provided at respective ends of the cylinder blocks 20 opposite to ends provided with the crankshaft 10. That is, the cylinder head 30R and the cylinder head 30L may be respectively provided at the ends on the right side and the left side.

The cylinder heads 30 may include combustion chambers 31, spark plugs 32, intake ports 33, exhaust ports 34, intake valves 35, exhaust valves 36, intake camshafts 37, exhaust camshafts 38, and fuel injectors 39, for example. The fuel injectors 39 will be hereinafter simply referred to as injectors 39.

For example, the combustion chambers 31 may be recessed and formed into a pent roof shape at portions of the cylinder heads 30. The portions may face crest surfaces of the pistons.

The spark plugs 32 may generate a spark in accordance with ignition signals from the engine control device 100 to ignite air-fuel mixture.

The spark plugs 32 may be provided at middle portions of the combustion chambers 31 when viewed in an axial direction of each of the cylinders.

The intake ports 33 may be provided on a side of each of the cylinder heads 30 as channel openings that introduce air for combustion or fresh air into the combustion chambers 31. The intake ports 33 may be coupled to an intake manifold 46 of the intake system 40, described later, to form an intake channel. The intake channel may take in and introduce atmospheric air to the combustion chambers 31 of the cylinders.

The exhaust ports 34 may be provided on another side of each of the cylinder heads 30, with respect to the intake ports 33, as channel openings that discharge burnt gas or exhaust gas from the combustion chambers 31. The exhaust ports 34 may be coupled to an exhaust manifold 51 of the exhaust system 50, described later, to form an exhaust channel. The exhaust channel may allow exhaust gas generated as a result of combustion to undergo a predetermined after-treatment. The exhaust channel may then allow the exhaust gas to exit to atmosphere.

The intake valves 35 and the exhaust valves 36 may open and close the intake ports 33 and the exhaust ports 34 at predetermined valve timings.

Two of the intake valves 35 and two of the exhaust valves 36 may be provided in each of the cylinders, for example.

The intake valves 35 and the exhaust valves 36 may respectively be opened and closed by the intake camshafts 37 and the exhaust camshafts 38 that rotate in synchronization with the crankshaft 10 at a speed of ½ of a rotational speed of the crankshaft 10.

Cam sprockets of the intake camshafts 37 and the exhaust camshafts 38 may be provided with valve timing variable mechanisms. The valve timing variable mechanisms may advance and retard phase angles of the camshafts to change valve opening periods and valve closing periods for the valves. The valve timing variable mechanisms are not illustrated.

The injectors 39 may inject fuel into the combustion chambers 31 in accordance with drive signals, i.e., valve opening signals, provided by the engine control device 100 to form air-fuel mixture.

The injectors 39 may have nozzles at respective tips. The fuel may be injected from the nozzles. In the combustion chambers 31, the nozzles may be exposed, into the cylinders, from inner surfaces forming regions adjacent to the intake ports 33. In other words, the nozzles may face spaces adjacent to the intake ports 33.

The intake system 40 may be an intake device that introduces air into the intake ports 33.

The intake system 40 may include an intake duct 41, a chamber 42, an air cleaner 43, an air flow meter 44, a throttle valve 45, the intake manifold 46, and an intake air pressure sensor 47, for example.

The intake duct 41 may be a channel that introduces external air into the intake ports 33.

The chamber 42 may be a space provided adjacent to and in communication with an inlet of the intake duct 41.

The air cleaner 43 may filter air to remove dust, for example.

The air cleaner 43 may be provided downstream of a portion at which the intake duct 41 and the chamber 42 are in communication with each other.

The air flow meter 44 may measure a flow rate of air passing through the intake duct 41.

The air flow meter 44 may be provided adjacent to an outlet of the air cleaner 43.

An output of the air flow meter 44 may be transmitted to the engine control device 100. In the example embodiment, it is possible in the engine control device 100 to calculate, from an air flow rate detected by the air flow meter 44, a mass of air to be taken into the cylinders per a predetermined unit of time such as a predetermined control cycle. Hereinafter, the mass of air to be taken into the cylinders may be referred to as an "intake air amount".

The throttle valve 45 may adjust an air flow rate to control an output of the engine 1. It is possible to achieve the throttle valve 45 by using a butterfly valve, for example.

The throttle valve 45 may be provided in the intake duct 41 at a position around which the intake duct 41 and the intake manifold 46 are coupled to each other.

The throttle valve 45 may be driven to open and close by an electric throttle actuator in accordance with a target degree of opening of throttle. The electric throttle actuator is not illustrated. The target degree of opening of throttle may be set by the engine control device 100 in accordance with driver's requested torque, for example.

The throttle valve 45 may be provided with a throttle sensor that detects a degree of opening of the throttle valve 45. An output of the throttle sensor may be transmitted to the engine control device 100.

The intake manifold 46 may be a branched pipe that delivers air to the intake ports 33 of the cylinders.

The intake manifold 46 may be provided downstream of the throttle valve 45.

The intake air pressure sensor 47 may detect pressure of air in the intake manifold 46, i.e., may detect intake air pressure.

An output of the intake air pressure sensor 47 may be transmitted to the engine control device 100.

The exhaust system 50 may be an exhaust device that allows exhaust gas to exit from the exhaust ports 34 to outside.

The exhaust system 50 may include the exhaust manifold 51, an exhaust pipe 52, a front catalyst 53, a rear catalyst 54, a silencer 55, an air-fuel ratio sensor 56, and a rear O2 sensor 57, for example.

The exhaust manifold 51 may be a collecting pipe that collects exhaust gas discharged from the exhaust ports 34 of the cylinders.

The exhaust pipe 52 may be a pipe channel that allows exhaust gas to exit from the exhaust manifold 51 to outside.

The front catalyst 53 and the rear catalyst 54 may be provided at an intermediate portion of the exhaust pipe 52. The front catalyst 53 and the rear catalyst 54 may include respective three-way catalysts that clean up HC, $NO_X$, and CO, for example, in exhaust gas.

The front catalyst 53 may be provided adjacent to an outlet of the exhaust manifold 51. The rear catalyst 54 may be provided behind an outlet of the front catalyst 53.

The silencer 55 may decrease acoustic energy in exhaust gas.

The silencer 55 may be provided adjacent to an outlet of the exhaust pipe 52.

The air-fuel ratio sensor 56 may be provided between the outlet of the exhaust manifold 51 and an inlet of the front catalyst 53.

The rear O2 sensor 57 may be provided between the outlet of the front catalyst 53 and an inlet of the rear catalyst 54.

The air-fuel ratio sensor 56 and the rear O2 sensor 57 may each generate an output voltage corresponding to a concentration of oxygen in exhaust gas.

The air-fuel ratio sensor 56 may be a linear output sensor that is able to detect a concentration of oxygen in exhaust gas at air-fuel ratios within a range. The range may be wider than a range of air-fuel ratios of exhaust gas from which the rear O2 sensor 57 may detect a concentration of oxygen.

Outputs of the air-fuel ratio sensor 56 and the rear O2 sensor 57 may both be transmitted to the engine control device 100. The air-fuel ratio sensor 56 may sometimes be referred to as a front O2 sensor. Output voltages of the O2 sensors 56 and 57 allow the engine control device 100 to know variations in air-fuel ratio in exhaust gas. An output voltage of the air-fuel ratio sensor 56 may be reflected in an air-fuel ratio feedback control. An output voltage of the rear O2 sensor 57 may be used in diagnosis of how much the front catalyst 53 is degraded.

The EGR device 60 may extract, as EGR gas, some of exhaust gas from the exhaust manifold 51 to allow the some of the exhaust gas to recirculate into the intake manifold 46.

The EGR device 60 may include an EGR channel 61, an EGR cooler 62, and an EGR valve 63, for example.

The EGR channel 61 may be a pipe channel that introduces exhaust gas or EGR gas from the exhaust manifold 51 into the intake manifold 46.

The EGR cooler 62 may allow EGR gas flowing through the EGR channel 61 to exchange heat with the cooling water in the engine 1 to cool the EGR gas.

The EGR cooler 62 may be provided at an intermediate portion of the EGR channel 61.

The EGR valve 63 may be a flow regulating valve that adjusts a flow rate of EGR gas passing through the EGR channel 61.

The EGR valve 63 may be provided downstream of the EGR cooler 62 in the EGR channel 61.

The EGR valve 63 may have a valve body that is driven to open and close by an electric actuator such as a solenoid. By using a map of degrees of opening, a degree of opening of the EGR valve 63 may be controlled by the engine control device 100. The map of degrees of opening may be set on the basis of a target EGR rate. The target EGR rate may be a flow rate of EGR gas/flow rate of intake air, for example.

The engine control device 100 may comprehensively control the engine 1 and its auxiliary equipment. In one embodiment, the engine control device 100 may serve as an "engine controller". In one embodiment, the engine control device 100 may include a configuration serving as a "fuel injection control device for an engine".

The engine control device 100 may include an information processor such as a central processing unit (CPU), storages such as a random access memory (RAM) and a read only memory (ROM), an input-output interface, and a bus that couples the information processor, the storages, and the input-output interface, for example.

The engine control device 100 may receive a signal from an accelerator pedal sensor 101. The accelerator pedal sensor 101 may detect how much a driver has depressed an accelerator pedal. The accelerator pedal is not illustrated.

The engine control device 100 may further receive a signal from an atmospheric pressure sensor 110.

The atmospheric pressure sensor 110 may be a pressure sensor that detects air pressure or atmospheric pressure in atmosphere around a vehicle.

The engine control device 100 may be configured to set driver's requested torque on the basis of an output of the accelerator pedal sensor 101, for example.

The engine control device 100 may control a degree of opening of throttle valve, boost pressure, a fuel injection amount, a fuel injection timing, an ignition timing, and a valve timing, for example, to allow the engine 1 to actually generate torque satisfying the set driver's requested torque.

The engine control device 100 may include an injection controller 102. The injection controller 102 may set a fuel injection amount. The injection controller 102 may then drive the injectors 39 in accordance with the set fuel injection amount.

In normal operation, the injection controller 102 may set a basic fuel injection amount on the basis of an intake air amount detected by the air flow meter 44. In one embodiment, the basic fuel injection amount may serve as a "basic supply amount". The injection controller 102 may further execute the air-fuel ratio feedback control on the basis of an output of the air-fuel ratio sensor 56. The injection controller 102 may thus correct the set basic fuel injection amount to allow an actual air-fuel ratio to fall within a window of each of the three-way catalysts.

The engine control device 100 may determine whether predetermined fuel cut conditions are satisfied. If the predetermined fuel cut conditions are satisfied, the engine control device 100 may execute a fuel cut. During the fuel cut, fuel injection by the injectors 39 may be stopped. During the fuel cut, ignition by the spark plugs 32 may also be stopped.

Examples of the fuel cut conditions may include, for example, that a travel speed or a vehicle speed of a vehicle is equal to or above a predetermined value, that an engine speed is equal to or above a predetermined value, and that driver's requested torque is equal to or below a predetermined value, e.g., is zero.

If predetermined fuel cut end conditions are satisfied after the fuel cut is performed, i.e., in a case where at least one of the fuel cut conditions described above is not satisfied, for example, the engine control device 100 may end the fuel cut. The engine control device 100 may then restart fuel injection and ignition.

In starting a fuel cut from a fuel injection state, the engine control device 100 may perform such a control that a fuel cut is sequentially executed at time intervals per cylinder in order to prevent output torque of the engine from changing suddenly.

In the example embodiment where a horizontally opposed, four-cylinder engine is adopted, an order of ignition may follow an order of a first cylinder, a third cylinder, a second cylinder, and a fourth cylinder, for example. In starting a fuel cut, the engine control device 100 may stop fuel injection and ignition in the cylinders in an order identical to the order of ignition, i.e., in the order of the first cylinder, the third cylinder, the second cylinder, and the fourth cylinder, for example.

The engine control device 100 may control a degree of opening of the throttle valve 45 to provide a desired feeling of deceleration or a desired degree of deceleration due to a pumping loss of the engine 1 upon execution of the fuel cut while the vehicle is traveling by inertia.

In a case where a degree of deceleration of the vehicle is greater than a target degree of deceleration, for example, a degree of opening of the throttle valve 45 may be increased to suppress a pumping loss. In a case where a degree of deceleration of the vehicle is smaller than the target degree of deceleration, a degree of opening of the throttle valve 45 may be decreased to increase a pumping loss.

Upon return from the fuel cut, the engine control device 100 may execute a fuel increase correction, described below, to suppress an air-fuel ratio from becoming lean due to air flowing back from the exhaust system 50 into the cylinders.

The engine control device 100 may include an injection amount correcting unit 103. The injection amount correcting unit 103 may perform an increase correction on a fuel injection amount on the basis of a reverse air amount from the exhaust channel into the combustion chambers 31 during execution of a fuel cut.

FIGS. 2A to 2C are diagrams illustrating a mechanism of how air flows back from the exhaust channel to each of the combustion chambers during a fuel cut in the engine 1 according to the example embodiment.

FIGS. 2A to 2C illustrate schematic cross sections taken along a plane including a central axis of each of the cylinders.

FIG. 2A illustrates a state where one of the pistons P lies around a bottom dead center at a final stage of a combustion stroke. In the state, the exhaust valves 36 are open. The state may be seen at a point A in FIG. 3.

FIG. 2B illustrates a state where the one of the pistons P is moving toward a top dead center at a middle stage of an exhaust stroke. The state may be seen at a point B in FIG. 3.

FIG. 2C illustrates a state where the one of the pistons P lies around the top dead center at a final stage of the exhaust stroke. In the state, the exhaust valves 36 are closed. The state may be seen at a point C in FIG. 3.

In a case where one of the pistons P lies around the bottom dead center after the combustion stroke, and the exhaust valves 36 are open, as illustrated in FIG. 2A, air may flow back and enter from the exhaust system 50, via the exhaust ports 34, into one of the cylinders C.

After that, as the one of the pistons P moves toward the top dead center, as illustrated in FIG. 2B, residual exhaust gas in the one of the cylinders C and the air flowed back from the exhaust system 50, for example, may be pushed out from the exhaust ports 34 toward the exhaust system 50.

In a case where the one of the pistons P reaches around the top dead center, as illustrated in FIG. 2C, the exhaust valves 36 may be closed. At this time, residual gas inside the one of the cylinders C may be in a state where residual exhaust gas and air, i.e., fresh air, flowed back from the exhaust system 50 are mixed with each other. An amount of the air contained in the mixed gas may be undetectable by the air flow meter 44.

Figure 3:
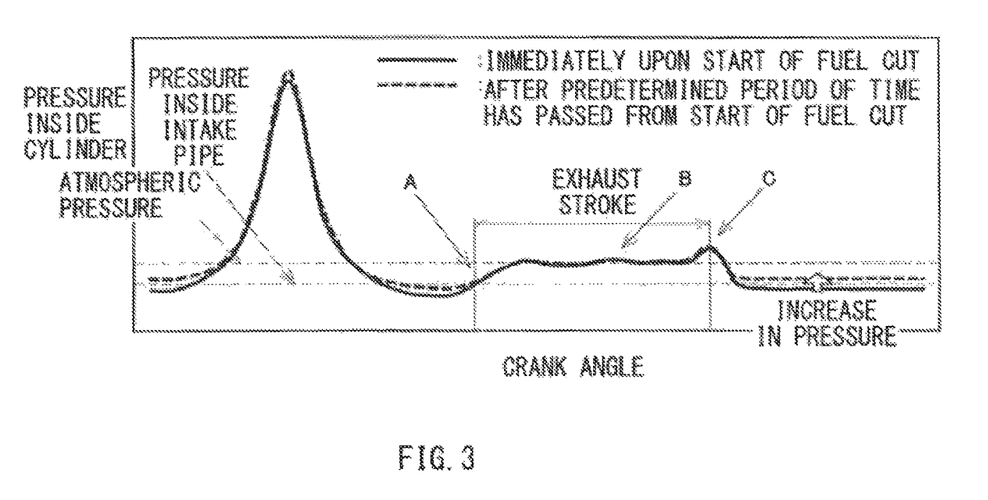
FIG. 3 is a diagram illustrating an example of how pressure transitions, with respect to a crank angle, in a cylinder during a fuel cut in the engine illustrated in FIG. 1.

FIG. 3 is a diagram illustrating an example of how pressure transitions, with respect to a crank angle, in each of the cylinders during a fuel cut in the engine 1 according to the example embodiment.

In FIG. 3, a horizontal axis may illustrate the crank angle. In a case where a rotational speed of the crankshaft 10 is constant, it is possible to read the crank angle illustrated on the horizontal axis as a time. A vertical axis may illustrate pressure in each of the cylinders C.

During a fuel cut where no combustion takes place in the combustion chambers 31, and thus heat due to combustion is not supplied, it is possible that a change in state of gas in each of the cylinders during a compression stroke is substantially regarded as adiabatic compression. It is also possible that a change in state of gas in each of the cylinders during an expansion stroke is substantially regarded as adiabatic expansion.

Pressure inside each of the cylinders at a final stage of the expansion stroke may therefore be identical to pressure inside each of the cylinders at an initial stage of the compression stroke.

At this time, pressure inside an intake pipe, i.e., pressure inside the intake manifold 46, may become lower than atmospheric pressure due to a venturi effect of the throttle valve 45.

From the intake stroke to the initial stage of the compression stroke, pressure inside each of the cylinders may become further lower than pressure inside the intake pipe due to channel resistance in the intake ports 33, for example.

A rear end of the exhaust manifold 51 may be open to atmosphere. This may allow pressure inside the exhaust manifold 51 to become substantially identical to atmospheric pressure.

During a fuel cut, pressure inside each of the cylinders when the exhaust valves 36 are open may be identical to pressure inside each of the cylinders when the intake stroke ends and the intake valves 35 are closed. When the exhaust valves 36 are open, gas may thus flow back from the exhaust ports 34 into each of the cylinders C.

During a fuel cut, gas to be pushed out from one of the cylinders C to the exhaust ports 34 during the exhaust stroke may be in a state where air constitutes a main component, and some of residual exhaust gas remaining in the one of the cylinders C is included.

In a case where, during a fuel cut, the crankshaft 10 of the engine 1 rotates to undergo some cycles, an amount of residual air in the exhaust system 50 may increase. A ratio of air in gas flowed back into the cylinders C may increase accordingly, facilitating scavenging.

In FIG. 3, a solid line illustrates how pressure transitions immediately upon start of a fuel cut, whereas a dashed line illustrates how pressure transitions after a certain period of time has passed from start of the fuel cut.

Due to the effects of air flowing back from the exhaust system 50, as described above, pressure inside each of the cylinders may increase after a certain period of time has passed from start of a fuel cut, as illustrated in FIG. 3.

In a case where it is possible to perform a fuel cut in some of the cylinders, an amount of increase in pressure inside each of the cylinders may increase in accordance with an increase in number of the cylinders that have undergone the fuel cut.

In a case where a fuel injection amount is set on the basis of an output of the air flow meter 44 upon end of a fuel cut and restart of fuel injection in a case where air has been flowing back from the exhaust channel into each of the cylinders, i.e., into each of the combustion chambers during the fuel cut, as described above, an air-fuel ratio, i.e., fuel, may become lean. Air may become excessive at this time. Output torque of the engine 1 may thus lower. In the vehicle, sacrificed drivability or ease of driving, as well as a misfire and an engine stall would be concerns.

In the example embodiment, an increase correction may be executed on a fuel injection amount, as described below, upon end of a fuel cut and restart of fuel injection, i.e., upon return from the fuel cut.

Figure 4:
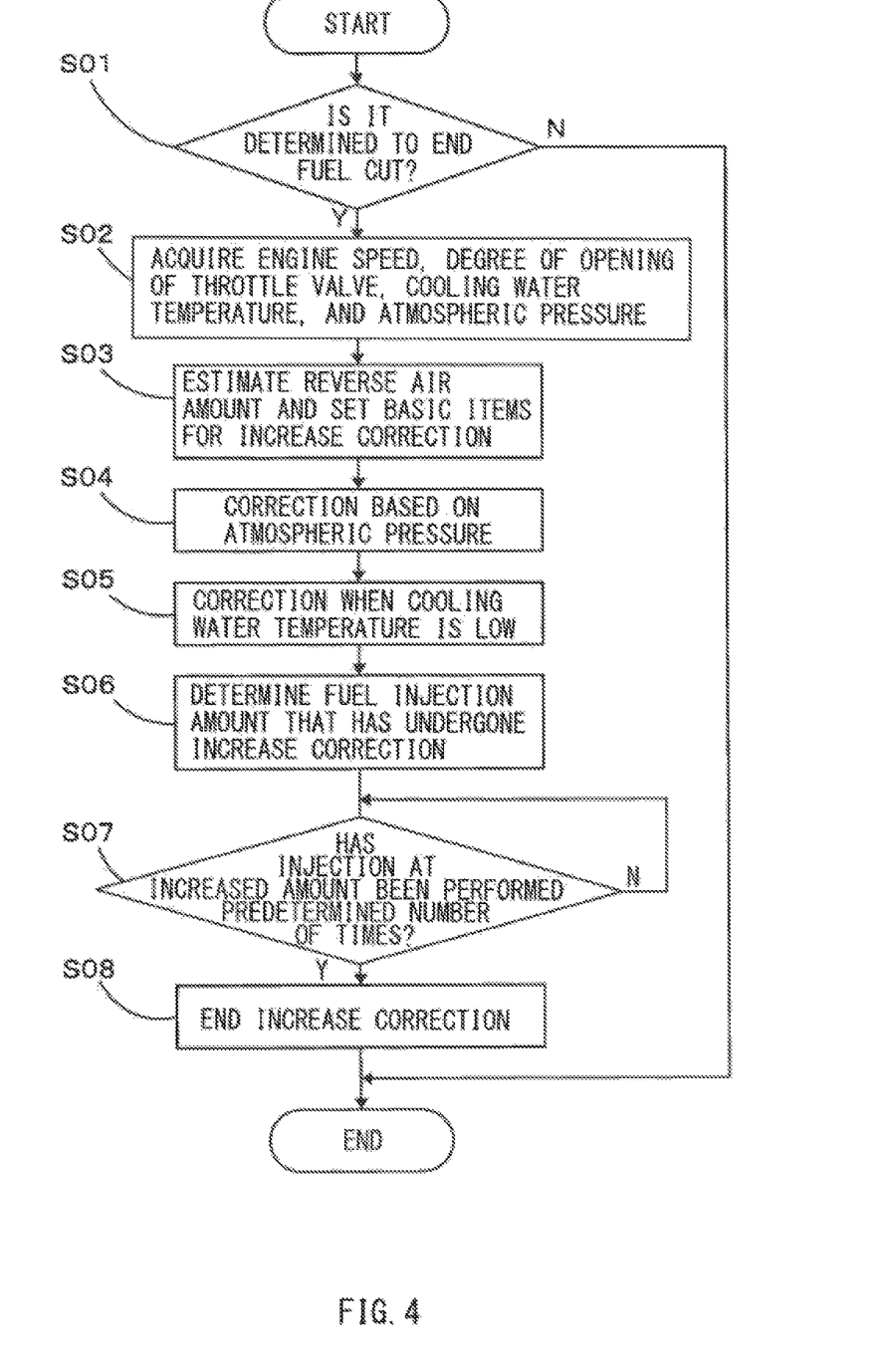
FIG. 4 is a flowchart illustrating a fuel increase correction control upon end of a fuel cut, according to the example embodiment illustrated in FIG. 1.

FIG. 4 is a flowchart illustrating a fuel increase correction control upon end of a fuel cut, according to the example embodiment. The control will now be described herein in an order of steps.

<Step S01: Determining when Fuel Cut should End>

The engine control device 100 may determine whether a state where a fuel cut is executed has switched to a state where the fuel cut conditions are not satisfied, and thus the fuel cut should end and fuel injection should be restarted. In a case where such a state is attained that the fuel cut should end (S01: Y), the control may proceed to step S02. In other cases (S01: N), the control may end a series of the processes in this routine.

<Step S02: Acquiring Various Parameters>

The engine control device 100 may acquire information regarding a rotational speed of the crankshaft 10, a degree of opening of the throttle valve 45, a cooling water temperature, and atmospheric pressure, on the basis of outputs of sensors, for example. After that, the control may proceed to step S03.

<Step S03: Estimating Reverse Air Amount and Setting Basic Items for Increase Correction>

The engine control device 100 may estimate a mass of air flowing back from the exhaust channel to the combustion chambers during execution of the fuel cut. The mass of air may be referred to as a reverse air amount. The engine control device 100 may then set, as basic items for increase correction, a fuel amount by considering that air at the estimated reverse air amount is to be combusted in a stoichiometric manner, i.e., a fuel amount desired for stoichiometric combustion with air at the reverse air amount.

It is possible to acquire a reverse air amount by using a reverse air amount map. The reverse air amount map may allow a reverse air amount to be read from a speed of the engine 1 or a rotational speed of the crankshaft 10 and a degree of opening of the throttle valve 45, for example. For example, the reverse air amount map be set per cylinder in accordance with a number of cylinders that undergo a fuel cut. It is possible that the reverse air amount map be set per type of the engine 1 experimentally or through simulations, for example. In a case where an engine includes a valve timing variable mechanism that causes a reverse air amount to change due to a valve timing, a configuration may include a plurality of reverse air amount maps corresponding to different valve timings. After that, the control may proceed to step S04.

<Step S04: Correction Based on Atmospheric Pressure>

The engine control device 100 may perform a correction on the basic items for increase correction set at step S03, on the basis of an output of the atmospheric pressure sensor 110. In a case where atmospheric pressure detected by the atmospheric pressure sensor 110 is lower than standard pressure, for example, pressure inside the exhaust system 50 may also lower, decreasing an amount of air flowing back into the combustion chambers. In this case, a decrease correction may be performed on the basic items for increase correction. An amount of the decrease correction at this time may be set greater in accordance with a decrease in atmospheric pressure. After that, the control may proceed to step S05.

<Step S05: Correction when Cooling Water Temperature is Low>

The engine control device 100 may detect a cooling water temperature of the engine 1 on the basis of an output of the water temperature sensor 21. In a low temperature state where a cooling water temperature is equal to or below a predetermined threshold, an increase correction may be performed on the basic items for increase correction. In the example embodiment, the basic items for increase correction may denote the basic items for increase correction corrected at step S04. An amount of the increase correction at this time may be increased in accordance with a decrease in cooling water temperature. After that, the control may proceed to step S06.

<Step S06: Determining Fuel Injection Amount that has Undergone Increase Correction>

The engine control device 100 may combine a fuel amount corresponding to the basic items for increase correction corrected at steps S04 and S05 with a fuel amount that is set on the basis of an intake air amount detected by the air flow meter 44, i.e., a basic fuel injection amount, to determine a final fuel injection amount. The engine control device 100 may output, to the injectors 39, a drive signal corresponding to the determined fuel injection amount to restart fuel injection in the engine 1. The engine control device 100 may further output a drive signal to the spark plugs 32 to restart ignition, i.e., combustion. After that, the control may proceed to step S07.

<Step S07: Determining when Increase-Corrected Injection should End>

The engine control device 100 may determine whether fuel injection in a state where an increase correction is performed on the basis of a reverse air amount has been performed a predetermined number of times after return from the fuel cut.

In a configuration where the predetermined number of times increases in accordance with an increase in number of cylinders that have undergone a fuel cut, for example, it is possible to make the predetermined number of times identical to the number of cylinders that have undergone a fuel cut. In a case where a fuel cut is performed in all four cylinders, for example, a fuel injection amount that has undergone an increase correction determined at step S06 may be applied at initial fuel injection in all the cylinders. In a case where a fuel cut has been performed only in an N number of cylinders, a fuel injection amount that has undergone an increase correction may be applied at initial fuel injection in the cylinders from a first one that has first undergone ignition upon end of a fuel cut to an N-th one in an order of ignition. In the example embodiment, N may be 1, 2, or 3. In restarting fuel injection from the second cylinder upon return from a state where a fuel cut has been performed in three of the cylinders, in a case where ignition timings are arranged in order of the first cylinder, the third cylinder, the second cylinder, and the fourth cylinder, for example, an increase correction corresponding to a reverse air amount may be performed only at initial fuel injection in the second cylinder, the fourth cylinder, and the first cylinder.

In a case where injection applied with a fuel injection amount that has undergone an increase correction has been performed the predetermined number of times (S07: Y), the control may proceed to step S08. In other cases (S07: N), the control may repeat step S07.

<Step S08: Ending Increase Correction>

The engine control device 100 may end an increase correction corresponding to a reverse air amount. The engine control device 100 may then restart the air-fuel ratio feedback control to set a fuel injection amount on the basis of an output of the air flow meter 44, and to appropriately correct the fuel injection amount on the basis of an output of the air-fuel ratio sensor 56. After that, the control may end the series of the processes in this routine (return).

Note that, in a case where the intake air pressure sensor 47 detects pressure in the intake pipe, i.e., pressure in the intake manifold 46, and the engine control device 100 temporarily performs a fuel injection control on the basis of the pressure, effects of a reverse air amount from the exhaust channel may be included in the pressure in the intake pipe. To prevent a correction from becoming excessive, an increase correction on a fuel injection amount based on the reverse air amount may be stopped.

In one embodiment, the injection controller 102 of the engine control device 100 may serve as a "fuel supply amount setting unit", a "fuel cut controller", and a "fuel injector controller". Furthermore, the injection amount correcting unit 103 may serve as a "fuel supply amount correcting unit".

According to the example embodiment, as described above, it is possible to achieve effects described below.

As described above, if air flows back from an exhaust channel into a combustion chamber during execution of a fuel cut, an actual air-fuel ratio, i.e., fuel, becomes lean due to effects of residual air in the combustion chamber, even if a fuel injection amount is set on the basis of an intake air amount detected by an air flow meter upon return from a fuel cut and restart of fuel injection. In this case, actual torque of an engine may lower with respect to target torque, sacrificing vehicle drivability or ease of driving. Furthermore, if a disturbance such as an increase in load occurs in a case where torque lowers as described above, less torque that does not correspond to the load and an engine stall would be concerns. To address such concerns, it is conceivable that an increase correction is performed on a fuel injection amount for a certain period of time upon restart of fuel injection. Since air flowing back from an exhaust channel into a combustion chamber is normally used for combustion and consumed at initial fuel injection in each cylinder, an excessive fuel injection amount due to an increase correction in fuel injection at a second time and onward in each cylinder, and a resultant excessively rich air-fuel ratio would be concerns. It has been desired that such concerns are addressed, making it possible to perform fuel injection at appropriate fuel amounts upon return from a fuel cut to suppress an air-fuel ratio from varying.

According to the example embodiment, a reverse air amount from the exhaust system 50, via the exhaust ports 34, to the combustion chambers 31 during execution of a fuel cut may be estimated. An increase correction may be performed on a fuel injection amount in accordance with an increase in the reverse air amount. This makes it possible to prevent an air-fuel ratio in each of the combustion chambers 31 from becoming lean even in a case where air flows back from an exhaust channel. Such an increase correction may be performed per cylinder only at initial fuel injection upon end of a fuel cut. This makes it possible to prevent an air-fuel ratio in each of the combustion chambers 31 from becoming rich due to the increase correction, in fuel injection at a second time and onward.

By making a number of cylinders that undergo an increase correction corresponding to a reverse air amount identical to a number of cylinders that have undergone a fuel cut, it is possible to perform an increase correction at an appropriate fuel injection amount allowing air flowed back from the exhaust channel to be fully combusted.

By setting a correction amount of increase correction, e.g., basic items, to be stoichiometric with respect to a reverse air amount, it is possible to prevent an air-fuel ratio from becoming either of lean and rich excessively due to an increase correction, allowing air flowing back from the exhaust channel to be appropriately combusted.

By estimating a reverse air amount on the basis of a rotational speed of the crankshaft 10 and a degree of opening of the throttle valve 45, and setting the basic items for increase correction, it is possible to estimate a reverse air amount by using parameters detectable by presently available hardware, in a case of an ordinary engine, to suppress necessary components from increasing in number and to perform an appropriate increase correction.

By decreasing a correction amount of increase correction in accordance with a decrease in atmospheric pressure, it is possible to suppress a correction amount of increase correction from being set to an excessively greater value in a situation where oxygen density is low, e.g., in a highland, preventing, for example, a misfire due to excessive supply of fuel.

By increasing a correction amount of increase correction in a warming-up incompletion state, for example, where a cooling water temperature is low, it is possible to increase a fuel injection amount to secure ease of ignition even in a cold environment where fuel faces difficulty in vaporization and ignition, and to prevent a misfire and an engine stall due to a misfire from occurring.

Modification Examples

The disclosure is not limited to the example embodiments described above. It is possible to variously modify or alter the disclosure. Such modifications and alterations still fall within the technical scope of the disclosure.

The configuration of the engine is not limited to the configuration according to the example embodiment described above. It is possible to appropriately alter the configuration. For example, the example embodiment described above may be applied in a horizontally opposed, four-cylinder, direct injection gasoline engine. However, the disclosure may be applied in an internal combustion engine of another type. For example, a cylinder layout, a number of cylinders, a type of fuel injection, and whether a supercharger is available are not particularly limited. Instead of a horizontally opposed type, the disclosure may be applied in an in-line or V-type internal combustion engine, for example. Instead of a four-cylinder type, the disclosure may be applied in a three-cylinder or six-cylinder internal combustion engine, for example. Furthermore, instead of a direct injection engine, the disclosure may be applied in a port injection engine. The disclosure may also be applied in an engine in which port injection and direct injection are combined, where both a fuel injector for port injection and fuel injectors for in-cylinder injection are provided, for example. It is still possible to apply the fuel injection control according to any embodiment of the disclosure even in a turbo-charged, internal combustion engine, in a case where the engine is controlled within a natural intake region by opening a waste gate valve in a low load condition, for example.

In the example embodiment described above, a reverse air amount may be acquired by using a reverse air amount map. With the reverse air amount map, a reverse air amount is read from a speed of the engine 1 and a degree of opening of the throttle valve 45. However, the disclosure is not limited to the example embodiment. A reverse air amount may be acquired on the basis of an intake air amount detected by the air flow meter 44, instead of a degree of opening of the throttle valve 45, for example.

In the example embodiment described above, an amount of increase correction on a fuel injection amount upon end of a fuel cut may be corrected on the basis of atmospheric pressure. However, an amount of increase correction may be corrected and decreased in accordance with a decrease in exhaust gas pressure in a configuration provided with an exhaust gas pressure sensor that detects pressure in the exhaust channel.

In the example embodiment described above, a warming-up incompletion state may be detected by using a cooling water temperature of the engine. However, the disclosure is not limited to the example embodiment. A warming-up incompletion state may be detected by using other parameters including an oil temperature of the engine or an external air temperature, for example.

In any embodiment of the disclosure, as described above, it is possible to set an appropriate fuel injection amount upon return from a fuel cut and restart of fuel injection, suppressing an air-fuel ratio from varying.

The engine control device 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine control device 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the engine control device 100 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A fuel supply system for an engine, the system comprising:
   a fuel injector configured to supply fuel into a combustion chamber of the engine;
   an air flow meter configured to detect an intake air amount of the engine; and
   an engine controller configured to control a fuel supply amount from the fuel injector,
   the engine controller including
      a fuel supply amount setting unit configured to set the fuel supply amount on a basis of the intake air amount detected by the air flow meter,
      a fuel cut controller configured to execute a fuel cut that stops supply of the fuel by the fuel injector if a predetermined fuel cut condition is satisfied, and to end the fuel cut if a predetermined fuel cut end condition is satisfied,
      a fuel supply amount correcting unit configured to perform, on a basis of a reverse air amount from an exhaust channel of the engine to the combustion chamber during execution of the fuel cut by the fuel cut controller, an increase correction on the fuel supply amount from the fuel injector upon end of the fuel cut in at least one cylinder of the engine, with respect to a basic supply amount corresponding to the intake air amount, an amount of the increase correction being greater at an initial fuel supply than in fuel supply at a second time and onward, and
      a fuel injector controller configured to output, to the fuel injector, a drive signal corresponding to the fuel supply amount that has undergone the increase correction by the fuel supply amount correcting unit.

2. The fuel supply system for the engine, according to claim 1, wherein the fuel supply amount correcting unit is configured to stop the increase correction based on the reverse air amount in fuel supply at the second time and onward.

3. The fuel supply system for the engine, according to claim 1, wherein
   the at least one cylinder of the engine comprises a plurality of cylinders,
   the fuel cut controller is configured to execute the fuel cut only in some of the plurality of cylinders, and
   the fuel supply amount correcting unit is configured to increase, in accordance with an increase in number of the cylinders that have undergone the fuel cut, a number of the cylinders that undergo the increase correction.

4. The fuel supply system for the engine, according to claim 2, wherein
   the at least one cylinder of the engine comprises a plurality of cylinders,
   the fuel cut controller is configured to execute the fuel cut only in some of the plurality of cylinders, and
   the fuel supply amount correcting unit is configured to increase, in accordance with an increase in number of the cylinders that have undergone the fuel cut, a number of the cylinders that undergo the increase correction.

5. The fuel supply system for the engine, according to claim 1, wherein the fuel supply amount correcting unit is configured to set the amount of the increase correction that allows a theoretical air-fuel ratio to be achieved with respect to the reverse air amount.

6. The fuel supply system for the engine, according to claim 2, wherein the fuel supply amount correcting unit is configured to set the amount of the increase correction that allows a theoretical air-fuel ratio to be achieved with respect to the reverse air amount.

7. The fuel supply system for the engine, according to claim 1, wherein
   the engine includes a throttle valve provided in an intake channel, and
   the fuel supply amount correcting unit is configured to set the amount of the increase correction on a basis of a rotational speed of an output shaft of the engine and a degree of opening of the throttle valve.

8. The fuel supply system for the engine, according to claim 2, wherein
   the engine includes a throttle valve provided in an intake channel, and
   the fuel supply amount correcting unit is configured to set the amount of the increase correction on a basis of a rotational speed of an output shaft of the engine and a degree of opening of the throttle valve.

9. The fuel supply system for the engine, according to claim 1, wherein the fuel supply amount correcting unit is configured to decrease the amount of the increase correction in accordance with a decrease in atmospheric pressure or pressure in the exhaust channel.

10. The fuel supply system for the engine, according to claim 2, wherein the fuel supply amount correcting unit is configured to decrease the amount of the increase correction in accordance with a decrease in atmospheric pressure or pressure in the exhaust channel.

11. The fuel supply system for the engine, according to claim 1, wherein the fuel supply amount correcting unit is configured to increase the amount of the increase correction in a case where the engine is in a predetermined low temperature state.

12. The fuel supply system for the engine, according to claim 2, wherein the fuel supply amount correcting unit is configured to increase the amount of the increase correction in a case where the engine is in a predetermined low temperature state.

13. A fuel injection control device for an engine, the fuel injection control device being configured to control a fuel injection amount of a fuel injector configured to supply fuel into a combustion chamber of the engine,
   the fuel injection control device comprising circuitry configured to
      set a basic injection amount of the fuel injector on a basis of an intake air amount of the engine,
      execute a fuel cut that stops injection of the fuel by the fuel injector if a predetermined fuel cut condition is satisfied,
      end the fuel cut if a predetermined fuel cut end condition is satisfied,
      perform, on a basis of a reverse air amount from an exhaust channel of the engine to the combustion chamber during execution of the fuel cut, an increase correction on the fuel injection amount at initial fuel injection by the fuel injector upon end of the fuel cut in at least one cylinder of the engine, with respect to the basic injection amount, an amount of the increase correction being greater at the initial fuel injection than in fuel injection at a second time and onward, and
      output, to the fuel injector, a drive signal corresponding to the fuel injection amount that has undergone the increase correction.

14. A fuel supply method for an engine, the fuel supply method being configured to control a fuel amount at which a fuel injector supplies fuel to a combustion chamber of the engine, the fuel supply method comprising:
- detecting an intake air amount of the engine;
- setting a basic value of the fuel amount on a basis of the detected intake air amount;
- executing a fuel cut that stops supply of the fuel by the fuel injector if a predetermined fuel cut condition is satisfied;
- ending the fuel cut if a predetermined fuel cut end condition is satisfied;
- performing, on a basis of a reverse air amount from an exhaust channel of the engine to the combustion chamber during execution of the fuel cut, an increase correction on a fuel supply amount from the fuel injector upon end of the fuel cut in at least one cylinder of the engine, with respect to the basic value, an amount of the increase correction being greater at an initial fuel supply than in fuel supply at a second time and onward; and
- controlling an operation regarding supply of the fuel by the fuel injector on a basis of the fuel supply amount that has undergone the increase correction.

* * * * *